United States Patent [19]

Qvist

[11] Patent Number: 5,501,291
[45] Date of Patent: Mar. 26, 1996

[54] SKIRT FOR AN AIR CUSHION VEHICLE AND FILAMENT MEMBER THERETO

[75] Inventor: Leif Qvist, Vanløse, Denmark

[73] Assignee: Dan/Hover c/o Leif Qvist, Vanlose, Denmark

[21] Appl. No.: 244,791

[22] PCT Filed: Dec. 8, 1992

[86] PCT No.: PCT/DK92/00371

§ 371 Date: Jun. 9, 1994

§ 102(e) Date: Jun. 9, 1994

[87] PCT Pub. No.: WO93/11985

PCT Pub. Date: Jun. 24, 1993

[30] Foreign Application Priority Data

Dec. 9, 1991 [DK] Denmark .................................. 1980/91
Jun. 25, 1992 [DK] Denmark .................................. 0840/92

[51] Int. Cl.⁶ ..................................................... B60V 1/16
[52] U.S. Cl. ........................................... 180/127; 180/129
[58] Field of Search ...................................... 180/116, 125, 180/127, 129, 122, 120

[56] References Cited

U.S. PATENT DOCUMENTS

| | | | |
|---|---|---|---|
| 3,055,446 | 9/1962 | Vaughen | 180/125 |
| 3,172,494 | 3/1965 | Cockerell | 180/127 |
| 3,208,543 | 9/1965 | Crowley | 180/121 |
| 3,249,167 | 5/1966 | Tibbetts | 180/127 |
| 3,273,663 | 9/1966 | Cockerell | 180/127 |
| 3,333,650 | 8/1967 | Hardy et al. | 180/128 |
| 3,468,395 | 9/1969 | Winter | 180/117 |
| 3,662,851 | 5/1972 | Ramsey | 180/116 |
| 4,702,332 | 10/1987 | Prentice | 180/127 |

FOREIGN PATENT DOCUMENTS 305812 11/1968 Sweden.

Primary Examiner—Margaret A. Focarino
Assistant Examiner—Victor E. Johnson
Attorney, Agent, or Firm—Sughrue, Mion, Zinn, Macpeak & Seas

[57] ABSTRACT

The air cushion chambers of an air cushion vehicle are horizontally delimited by a skirt. The skirt comprises brushes with elongated downwards extended filaments (9), which have downwards diminishing cross-sectional area thereby providing the brushes with sufficient stiffness to maintain the pressure in the air cushion chamber and such a large flexibility in the lower section of the skirt that ice can hardly deposit thereon. The filament members are mounted in a guide profile (2) in such a manner that above the members there is a chamber (12) for dispersion and conveying of deicing fluid which form the chamber (12) via a flow passage in every filament member may pass down into a clearspace (10) between the filaments (9). At least one of the filaments (109) has forward protruding web (115) on one of its sides and a backwards protruding web (116) on its other side. When mounted, the webs of the filaments may seize each other when the skirt is transversely deflected and thereby the webs lock the individual brush members to one another which provides the skirt with a larger stiffness in the transverse direction.

5 Claims, 3 Drawing Sheets

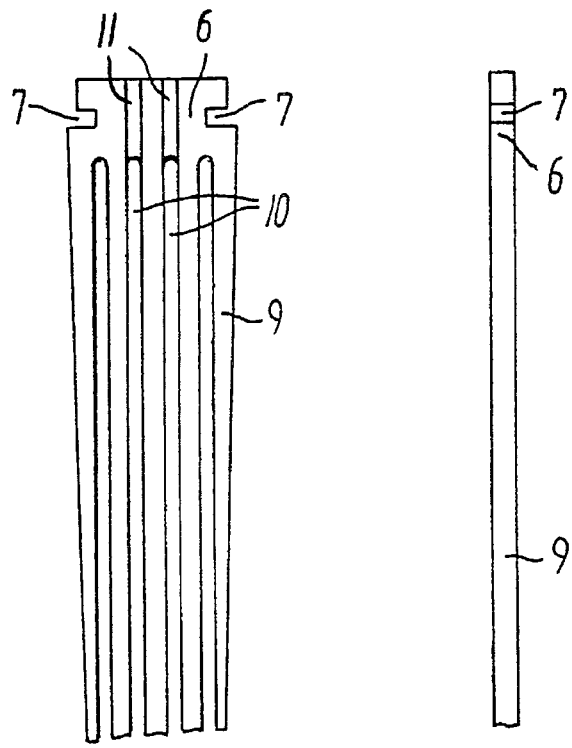
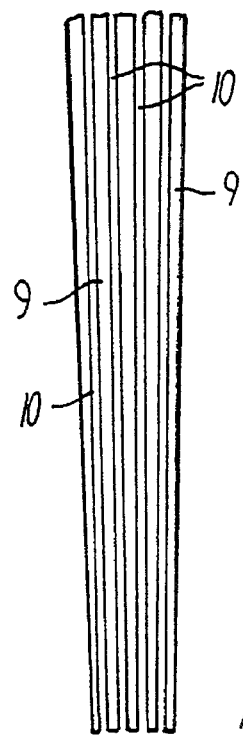
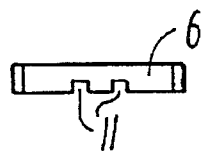
FIG. 2　　　FIG. 3
FIG. 4

SKIRT FOR AN AIR CUSHION VEHICLE AND FILAMENT MEMBER THERETO

BACKGROUND OF THE INVENTION

1. Field of the Invention

The invention relates to filament member for a skirt for an air cushion vehicle which has beneath the bottom of the vehicle hull a number of air cushion chambers which are delimited in horizontal direction by the skirt and into which air supply means may blow air for maintaining the air cushion in the air cushion chamber during operation of the vehicle, the skirt including elongated, downwards extending filaments.

2. Description of the Prior Art

A skirt for an air cushion vehicle is known from the U.S. Pat. Nos. 3,249,167 and 3,172,494 showing skirts with brushes in the form of rods, wires, cords, chains or filaments made of plastic.

Another skirt is known from SE-B-305812, where skirt members are hanging down from the hull. The flexible skirt members are shaped with large cross-sections merging into each other such as triangular cross-sections with the apex facing alternatively inwards and outwards. These skirt members are not of the filament type.

The skirt extends along the periphery of the air cushion chambers and serves to prevent the air from freely escaping the chambers. In the traditional air cushion vehicles the skirt is constructed from a continuous rubber sheet, but such a sheet is frequently exposed to damage when the air cushion vehicle crosses obstacles which may seize the skirt.

A skirt of brushes as known from the above U.S.A.-patents possess the advantage that obstacles may pass freely through the brushes without damaging these.

It is a well known problem of air cushion vehicles that they hardly can be used in waters where there is risk of icing up because the ice is easily formed on the skirt and impedes the correct functioning thereof. This problem is especially distinct by the brushformed skirts having a very large surface area compared to the length of the skirt. As air cushion vehicles are very sensitive to weight changes even smaller deposits of ice on the skirt may demand suspension of the vehicle operation.

The object of the invention is to provide a skirt more appropriate for navigation in cold waters.

With this aim the filament member according to the invention is characterized in that the filament member has an upper base portion with engagement means for the attachment of the member to a retainer, and that the member includes several juxtaposed elongated filaments extending from the base portion and having less cross-sectional area at the free end of the filaments than at the root thereof. Such a member may in a simple manner be manufactured from a plastics material by means of injection moulding and it provides for assembling a skirt having any desired length simply by placing in the retainer a number of members corresponding to the desired skirt length. As each member only comprises comparatively few filaments such a skirt is repairable at low-costs in the event of skirt damages, because only the damaged members are to be replaced.

SUMMARY OF INVENTION

By designing the filaments with less cross sectional area at their lower ends, that are most frequently in contact with the water and consequently especially exposed to icing, they are here substantially more flexible than at their upper ends. The larger flexibility results in larger deflections and more rapid movements in the lower section of the skirt, thereby enabling any deposited ice to loosen and fall off the skirt. The larger cross-sectional area in the upper part of the filaments ensures that the skirt preserves sufficient stiffness in order to keep the air inside the air cushion chamber. The embodiment according to the invention thus gives due consideration to the conflicting considerations that the skirt must have the sufficient stiffness to confine the air, but also a flexibility to prevent icing. With the view of further preventing ice formations on a skirt the filament member is advantageously designed so that at the base portion there is at least one flow passage which may set at least one interspace between the filaments in flow communication with a chamber for conveying de-icing fluid. The de-icing fluid may be a hot gas, e.g. extracted hot compartment air from the cabin of the vehicle or exhaust gas from the main engine of the vehicle. A ventilator may press the hot gas into the chamber wherefrom the gas via the flow passage will be conveyed down between the filaments and heat these thereby counteracting ice formations. The de-icing fluid may alternatively be a proper de-icing agent, like propyl alcohol, which by a pump is injected into the chamber, wherefrom it can flow through the flow passage and downwards over the filaments and prevent ice formations.

In a preferred embodiment the thickness of the filament member in the longitudinal direction of the skirt is substantially even over the entire length of the member, whereas the width of the filaments of the member, in the transverse direction of the skirt, diminishes towards the tip of the filaments. When the members are assembled to a complete skirt the by and large even thickness of the members in the length direction of the skirt has as a consequence that filaments abut against each other to form a surface which in its undeformed condition is continuous and provides an effective barrier to the air in the air cushion. The diminishing width of the filaments in the transverse direction ensures the large flexibility in the transverse direction of the skirt aimed at for the removal of ice.

In an especially simple embodiment the retainer is a guide profile with a downwards facing opening for receiving the filament members, and the profile and the engagement means on the members are designed so that in the profile above the assembled members there is a chamber extending in the longitudinal direction of the profile and serving for dispersion and conveying of de-icing fluid. By designing the chamber as an integral part of the retainer the number of structural parts of the skirt are minimized and consequently, the skirt can be manufactured at low costs. The guide profile may further be made in a standard length which can receive a certain number of filament members thus permitting an easy and rapid renewal of skirt sections.

According to the invention it is also possible to design the filament member so that the skirt gets larger resultant transversal stiffness, namely by the filament member being characterized in that at least one of the juxtaposed elongated filaments has a web that protrudes in the longitudinal direction of the skirt and is intended to project over part of the adjacent filament member.

The projecting web has the effect that the individual filament members in the skirt to some extent are connected thereby preventing a separate deflection of an individual filament member, because a transversely deflecting filament pulls the adjacent filaments into its deflection movement.

In a preferable, simple embodiment the filament with the web is Z-shaped in sectional view and has, when mounted, a forwards extending web on one side of the filament and a backwards extending web on its other side. When the filaments are mounted in the retainer the forwards projecting web of one member is situated opposite the backwards facing web of the adjacent member, so that the two mentioned webs will seize each other, if the member is deflected in the transverse direction of the skirt. Due to the fact that the body portion of the Z-shape extends in the transverse direction of the skirt the filament member further obtains a comparatively large stiffness in this direction thereby allowing, with only a small number of filaments in the transverse direction of the skirt, maintenance of adequately high positive pressure in the air cushion chambers delimited by the skirt.

The filament member may include at least three filaments of which two outer filaments have substantially larger dimension in the transverse direction of the skirt than a central filament. The two outer relatively stiff filaments provide the skirt with the desired stiffness against bending, while the central filament has larger flexibility and is capable of rapidly adjusting to local pressure variations across the skirt and thus form an effective air barrier.

This embodiment may be further detailed so that the two outer filaments have a Z-shaped cross-section and the central filament has a cross-section being elongated in the longitudinal direction of the skirt. The central filaments bear against each other and form a wall-like air barrier and they are kept in position by the substantially more rigid outer filaments, which due to the Z-shape ensure an effective inter locking of the individual filament members.

The invention further relates to a skirt being composed of a large number of the above filament members.

The invention will now be described in detail with reference to the schematical drawings, in which

BRIEF DESCRIPTION OF THE DRAWING

FIG. 2 shows an individual filament member according to the invention, in plan view, FIG. 3 shows an individual filament member in side elevation, FIG. 4 shows an individual filament member viewed from above.

A further description of the design and mode of operation of an air cushion vehicle can be found in the description of the two above mentioned USA-patents.

Figure 1:
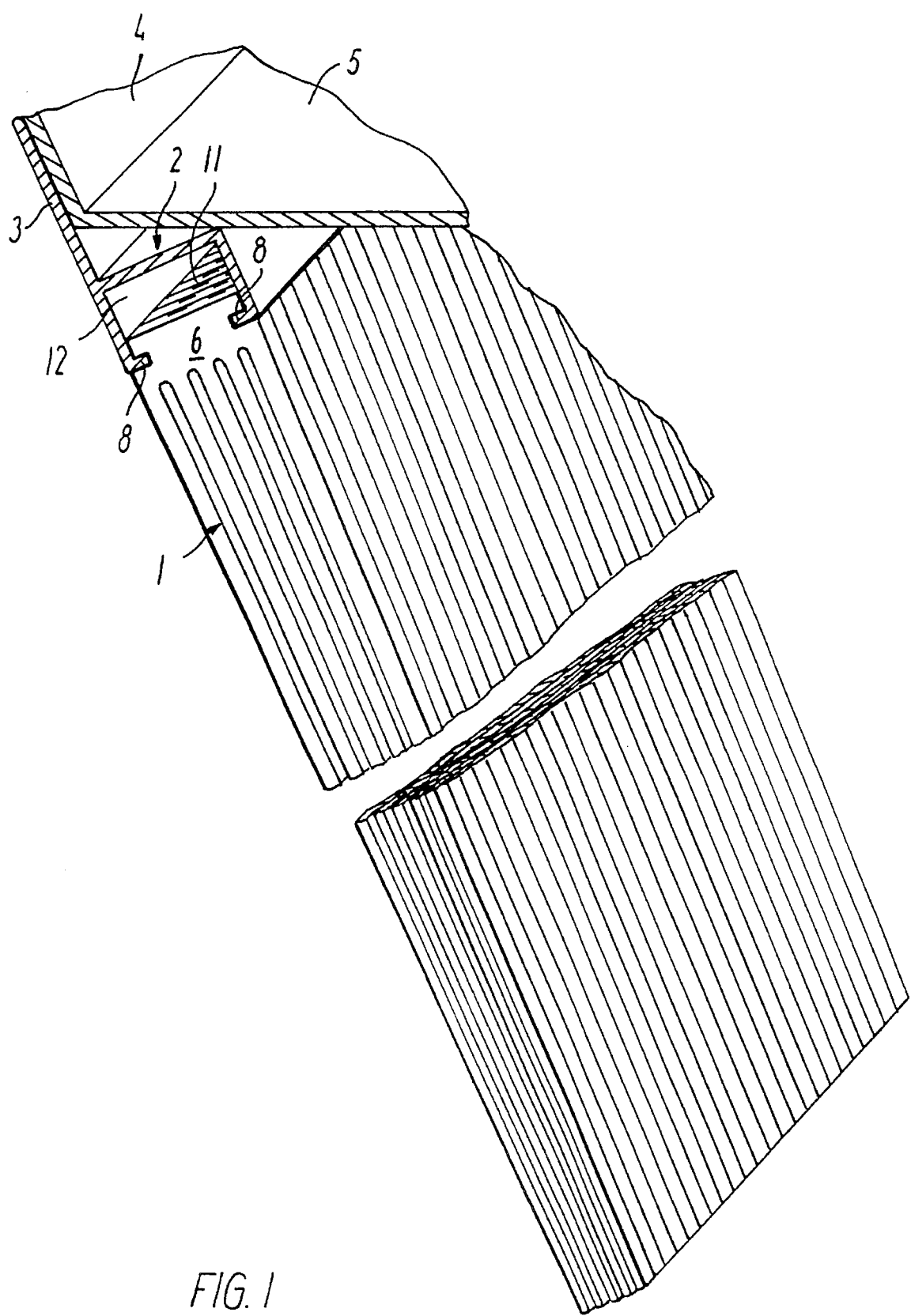
FIG. 1 in a sectional perspective view shows a skirt section mounted at the bottom of the vehicle hull.

FIG. 1 shows in sectional view a skirt section according to the invention. A rather large number of filament members 1 are mounted in a guide profile 2 having an upwards extending mounting flange 3 which by means of fastening means, such as bolts, not shown, is fastened to the sidewall 4 of the vehicle hull. The guide profile 2 with the filament members is mounted directly beneath the bottom of the hull 5 and preferably in such a manner that the skirt downwards is angled slightly inwards towards the middle of the air cushion chamber, because the angling of the skirt contributes to preventing air leakage from the air cushion chamber positioned to the right of the skirt shown in FIG. 1.

Each member 1 has a base portion 6 with engagement means in the form of two grooves facing in the transverse direction of the skirt for receiving inwards bent projections 8 at the lower end of the guide profile. It appears directly that the members in a simple manner may be inserted onto the projections 8 until the guide profile is filled up with the filament members abutting against each other.

From the base portion 6 five elongated filaments 9 extend in the downwards direction which filaments are transversely separated by interspaces 10. The filaments are elongated stands or rods which in the transverse direction taper downwards so that they have less cross-sectional area in increasing distance from the base portion. Thus a suitable stiffness against transverse deflection in the upper section of the filament is combined with the desired flexibility for preventing ice formations.

As will appear from FIG. 3 the filaments have by and large an even thickness along the length of the skirt member. The filaments may, however, also taper in the length direction of the skirt, the filaments may e.g. be conical, but preferably they are designed as shown, which provides for a good barrier effect against air leakage from the air cushion chamber.

Two grooves 11 are made so in the one lateral face of the base portion that they create a flow passage between the associated interspaces 10 and a chamber 12 positioned in the guide profile 2 above the base portion, when the members are mounted in the profile. A not shown connecting piece for supply of de-icing fluid is mounted in the guide profile, so that the piece debouch in chamber 12. The piece is connected with a supply pipe for de-icing fluid and by means of a valve the fluid may be admitted according to need. Naturally it is possible to provide the guide profile with connection pipes for both hot gas and de-icing liquid such as propyl alcohol. Normally it is only necessary to supply propyl alcohol immediately before initiation of the navigation or immediately after termination of navigation thereby preventing icing of the skirt during standstill of the vehicle.

If the exhaust gas of the main engine is used as an de-icing fluid there should be a fan for suction of the exhaust gas, so that the engine is spared from operating against an excess pressure in the exhaust system.

When the de-icing fluid is admitted to chamber 12, as a consequence of the relatively large volume above the base portion of the skirt members, the fluid disperses itself evenly along the chamber in the guide profile, wherefrom the fluid penetrates through grooves 11 and into interspace 10 between the filaments.

Due to the fact that the filaments substantially abut against each other the de-icing fluid may penetrate down to the lower end of the filaments and protect these against ice-formations.

It is obvious, that the filament member 1 may have a larger or less number of juxtaposed filaments. The number of filaments and the length of these are adjusted to the size of the vehicle and to the desired air pressure in the air cushion chamber.

The brush member may in a simple manner be manufactured as an injection moulded plastic member.

In the same manner as described above the second embodiment of the filament member 101 according to the invention has a base portion 106 with engagement means in the form of two grooves 107 facing in the transverse direction of the skirt. A central filament 113 and two outer filaments 109 extend in the downwards direction from the base portion 106. Two grooves 111 in the base portion set the interspaces 110 between the central and the two outer filaments in flow communication with the area situated above the base portion 106.

Figures 5, 6, 7, 8:
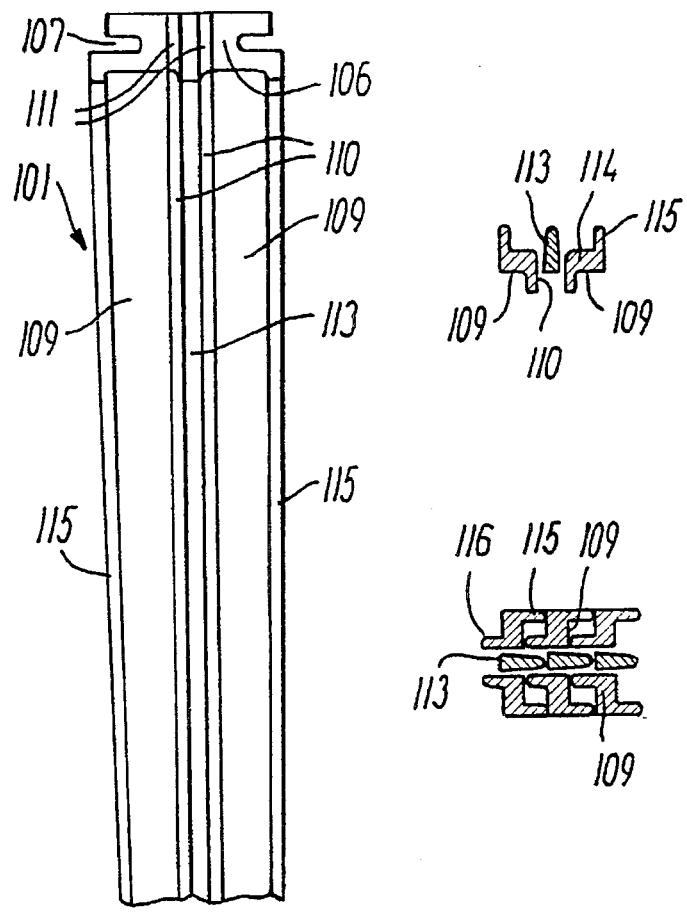
FIG. 5 is a plan view of a second embodiment of a member according to the invention where the middle section of the member has been omitted.
FIG. 6 is a cross-section through the filament member along the line VI—VI in FIG. 5.
FIG. 7 is a sectional view of the member.
FIG. 8 is a top end view view through three juxtaposed filament members.

As best shown in FIGS. 6 and 8 each of the outer filaments has Z-shaped cross-section, where a forwards, in the longitudinal direction of the skirt, protruding web 115 at the outer side of the filament member extends from a middle portion 114 having a comparatively large cross-sectional area and a backwards directed web 116 extends from the diagonally opposite side of the middle portion. The forwards projecting web of one filament member overlaps the backwards facing web of the adjacent member so that the filament members may seize each other in the transverse direction of the skirt.

The central filaments 113 have an oblong, mainly plane shape and are positioned very closely to each other and form a wall blocking the air flow, when the filament members are in the mounted position.

I claim:

1. A skirt for an air cushion vehicle having a number of air cushion chambers which are horizontally, outwardly delimited by the skirt in its transverse direction, which skirt extends in a longitudinal direction, said skirt comprising: elongated filament members extending downwardly, each filament member having an upper base portion with engagement means for attaching the filament member to a retainer adjacent another filament member in said longitudinal direction of the skirt, said filament member including at least three elongated filaments extending from the base portion and having a taper in cross-sectional area towards a free end of said filament, said at least three filaments being juxtaposed in said transverse direction of the skirt to include an inner filament and an outer filament and a central filament, said inner and outer filaments having a substantially larger dimension in said transverse direction of the skirt than said central filament, and at least one of said juxtaposed elongated filaments having at least one web that protrudes in said longitudinal direction of the skirt and projects over a portion of the adjacent filament member.

2. A skirt according to claim 1, wherein the thickness of said filament member in said longitudinal direction of the skirt is substantially even from said base portion to said free end of said filaments, and the width of said filaments, in said transverse direction of the skirt, diminishes towards the free end of said filaments.

3. A skirt according to claim 1, wherein said filament with said at least one web in cross-sectional view is Z-shaped with two webs projecting in said longitudinal direction of the skirt.

4. A skirt according to claim 3, wherein said inner and said outer filament have a Z-shaped cross-section, and said central filament has a cross-section being elongated in said longitudinal direction of the skirt.

5. A skirt according to claim 1, wherein two of said filaments of said filament member are separated in said transverse direction of the skirt by a predetermined distance, and said base portion of said filament member includes an upper side and at least one flow passage for admission of de-icing fluid, the flow passage extending from said upper side to the separation in said two filaments.

* * * * *